United States Patent [19]

Young

[11] Patent Number: 4,488,851
[45] Date of Patent: Dec. 18, 1984

[54] POWER MANAGEMENT SYSTEM

[75] Inventor: Harvey R. Young, Williamsburg, Va.

[73] Assignee: The United States of America as represented by the Secretary of the Army, Washington, D.C.

[21] Appl. No.: 364,573

[22] Filed: Apr. 1, 1982

[51] Int. Cl.³ .............................................. B64C 11/46
[52] U.S. Cl. .................................. 416/33; 244/17.21; 244/60
[58] Field of Search ........................... 60/39.03, 39.33; 244/17.21, 53 R, 60; 416/33, 43; 73/862.32, 862.33, 862.34

[56] References Cited

U.S. PATENT DOCUMENTS

| | | | |
|---|---|---|---|
| 2,699,833 | 1/1955 | Jensen | 241/17.21 |
| 2,947,168 | 8/1960 | Yang | 73/862.34 |
| 3,225,592 | 12/1965 | Greene | 416/43 |
| 3,506,219 | 4/1970 | Moville et al. | 244/17.21 |
| 3,604,255 | 9/1971 | Bart | 73/862.34 |

Primary Examiner—Louis J. Casaregola
Attorney, Agent, or Firm—Anthony T. Lane; Robert P. Gibson; Norman L. Wilson, Jr.

[57] ABSTRACT

A power management system is disclosed for an advanced helicopter having both lift and thrust propulsion units and at least one power plant which comprises, a signal generator for generating a first signal which is proportional to the power available from the power plant, a circuit connected to the lift propulsion unit which has an output that varies according to the amount of power used by that propulsion unit and which receives the first signal for generating a second signal which is proportional to the amount of power remaining. The circuit is either used to power a limit actuator for limiting the amount of power the pilot can apply to the thrust propulsion unit or drive an indicator which indicates to the pilot the amount of power remaining for the thrust propulsion unit, or perform both functions.

2 Claims, 5 Drawing Figures

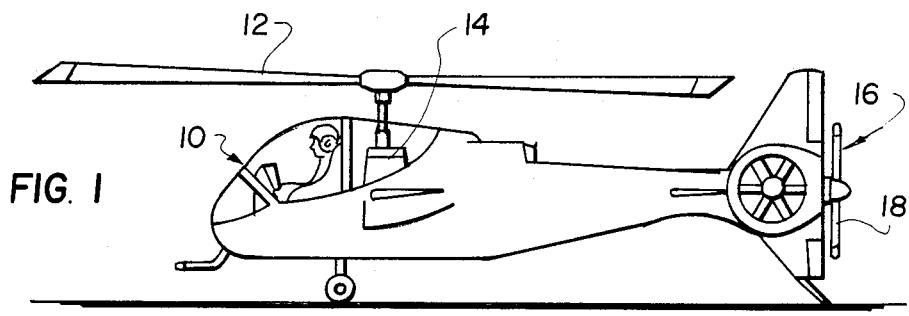
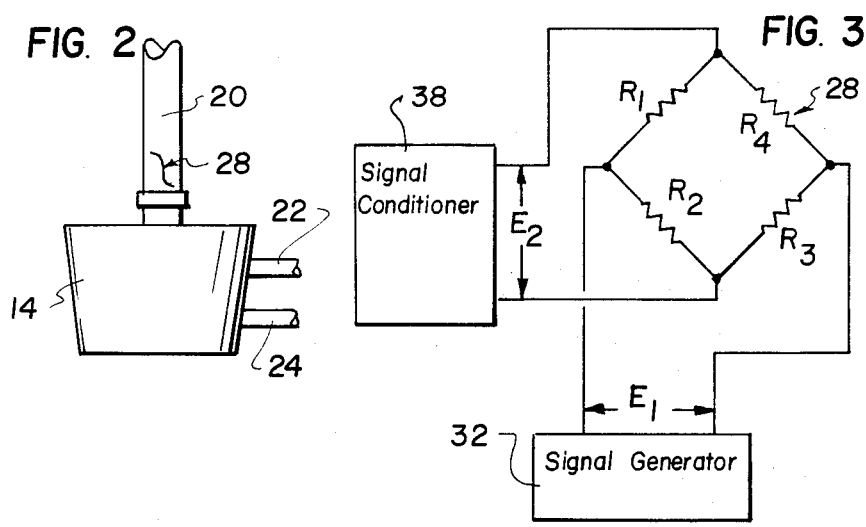
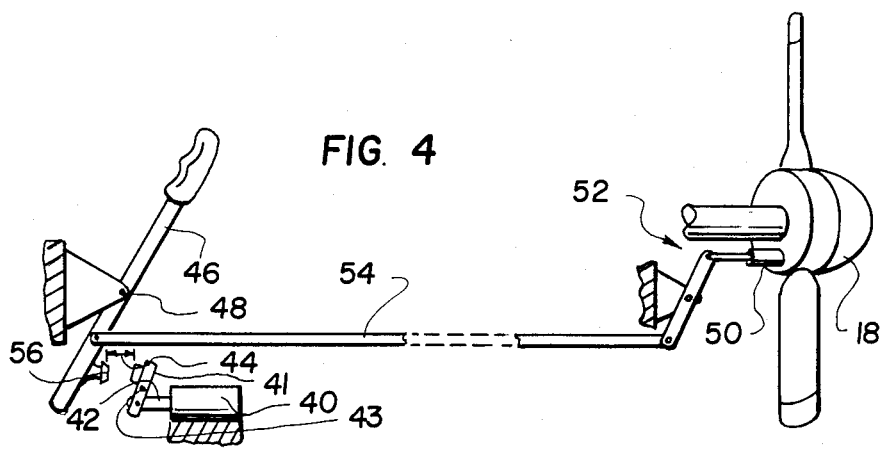

POWER MANAGEMENT SYSTEM

FIELD OF THE INVENTION

The present invention relates in general to a multi-propulsion unit flying vehicle and, in particular, to a new and useful power management system which indicates or utilizes the amount of power remaining for an auxiliary propulsion unit, after a main propulsion unit has satisfied its power requirements.

DESCRIPTION OF THE PRIOR ART

Systems and methods are known for varying for amount of power which is supplied from one or more power plants to a plurality of propulsion units. One example is found in U.S. Pat. No. 3,253,806 to Eickmann. This patent discloses a method of regulating the amount of hydraulic fluid supplied to a plurality of hydraulic fluid motors connected in series. Each motor powers a rotor or propellor. The torque applied to each rotor or propellor can be varied to control the movement of the flying vehicle.

U.S. Pat. No. 3,861,623 to Fruechte discloses a system of transferring torque from one engine to a second engine in a multi-engine craft where the second engine has become disabled.

U.S. Pat. No. 4,139,170 to Albert discloses a system of remotely controlling a flying vehicle, using electronic signals which are resistant to jamming.

The foregoing references thus disclose various approaches to power management. In conventional helicoptors, it is known to use a main rotor to provide both lift and thrust for translational movement. Higher aircraft speeds however can be obtained if the main rotor is used primarily for lift while another system is used for providing forward thrust. This principle has been flight demonstrated on various types of helicoptors that were equipped with turbojet engines for auxiliary propulsion in addition to the normal turboshaft engines for powering the main rotor or rotors. The disadvantage of this arrangement is that two independent propulsion systems are required. This results in a heavy, inefficient and complex propulsion system.

An integrated lift/thrust propulsion system that would selectively power the rotor or rotors for lift or power the fans or other propulsion units for thrust, or distribute power as desired between these subsystems, would eliminate the disadvantages of independent propulsion systems. The purpose of the present invention is to provide a means for power management between rotors and fans, in the specific case of a helicopter, and more generally for power management between a main and an auxiliary power unit, that are driven by a common source of power.

In a conventional helicoptor, an increase in rotor blade pitch creates a demand for an increase in engine power. In an advanced helicoptor that uses an integrated lift/thrust propulsion system, an increase in either rotor blade pitch or fan/prop pitch or both, would cause an increase in engine power. However, since in a practical design, the engine is not capable of satisfying all of the combinations of power demands of the rotor and fan/prop, a control system is needed to prioritize power demands of the lifting and thrusting devices or units.

Accordingly an object of the present invention is to provide a power management means for integrated lift/thrust propulsion systems that accomplishes the following:

1. Prioritizes available engine power in favor of the helicoptor rotor system, that is satisfies rotor power demands under all operating conditions; and
2. Makes excess engine power available to power a thrust or auxiliary device, to the fullest possible extent.

SUMMARY OF THE INVENTION

The underlying concept of this invention is to subtract the torque (or power) required to drive the rotor(s) from the total available engine torque (or power) and make the remaining torque (or power) available to power the thrusting device (prop or fan). Since the rotor torque (or power) changes with atmospheric and/or flight condition changes, a method is needed to perform the subtraction, i.e. engine torque minus rotor torque, in real time, and use the remainder as a signal to establish the setting (or limits) of the blade pitch of the thrusting device.

DETAILED DESCRIPTION OF THE INVENTION

In an advanced helicoptor equipped with a propeller for forward thrust augmentation, the main rotor provides 100% of the lift and is capable of producing forces that cause the helicoptor to translate forwardly, to the side, or rearwardly. The propellor develops thrust that accelerates or decelerates the helicoptor and/or maintains a steady speed, but in the longitudinal axis only. In operation at lower speeds, the pilot has the option of using only the main rotor for forward acceleration or of using only the propeller or a combination of forces developed by the rotor and propeller. At higher speeds, as rotor stall is encountered, the propellor would produce most or all of the required forward thrust. This however is only one possible configuration of an advanced, high speed helicoptor. Other configurations may use fans rather than props, dual rotors rather than a single rotor, a conventional tail rotor in lieu of a fan-in-fin, and multiple engines. The principle of this invention can be applied to any of these helicoptor configurations.

A common method of measuring torque supplied to a helicoptor rotor is to strain gage the rotor shaft and use a pre-calibrated strain-to-torque relationship for determining the instantaneous torque supplied to the rotor. Rotor power can be derived by simply multiplying torque by shaft rotational speed and dividing by a constant to obtain horsepower. Since rotor RPM is commonly measured on all helicoptors, the derivation of rotor power is straightforward and easily accomplished. However, in most instances, rotor torque would probably be used as the primary signal to facilitate the power management system. The electrical signal (voltage) from the rotor shaft strain gage is generated from time of the rotor start-up to rotor shut-down. Therefore, this signal is continually available and can be subtracted, in real time, from an electrical signal (voltage) that represents total available engine torque.

One object of this invention is to provide a power management system for managing the power from at least one power plant of a flying vehicle having a main and at least one auxiliary propulsion unit powered by the power plant, comprising a signal generator for generating a first signal which is proportional to the power available from the power plant, a circuit connected to the main propulsion unit which has an output that varies according to the power used by the main propulsion unit and receives the first signal for generating a second signal which is proportional to the power remaining for the auxiliary propulsion unit.

A further object of the invention is to utilize the second signal to actively participate in power management by physically limiting the amount of power that the pilot can apply to the auxiliary propulsion unit, through a control member for example or to drive an indicator to indicate to the pilot the amount of power remaining for use in the auxiliary propulsion unit or to accomplish both of these functions.

Another object of the invention is to provide a power management system which is simple in design, rugged in construction and economical to manufacture.

The various features of novelty which characterize the invention are pointed out with particularity in the claims annexed to and forming a part of this disclosure. For a better understanding of this invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is an elevational view of an advanced helicoptor having main rotor and auxiliary propulsion units;

FIG. 2 is a simplified fragmentary elevational view of the power transmission and main rotor shaft of the helicoptor in FIG. 1;

FIG. 3 is a schematic circuit diagram according to the invention;

FIG. 4 is an illustrative diagram showing a control system activatable by a pilot for supplying excess power to the auxiliary propulsion unit according to the invention.

DESCRIPTION OF PREFERRED EMBODIMENTS

Figure 5:
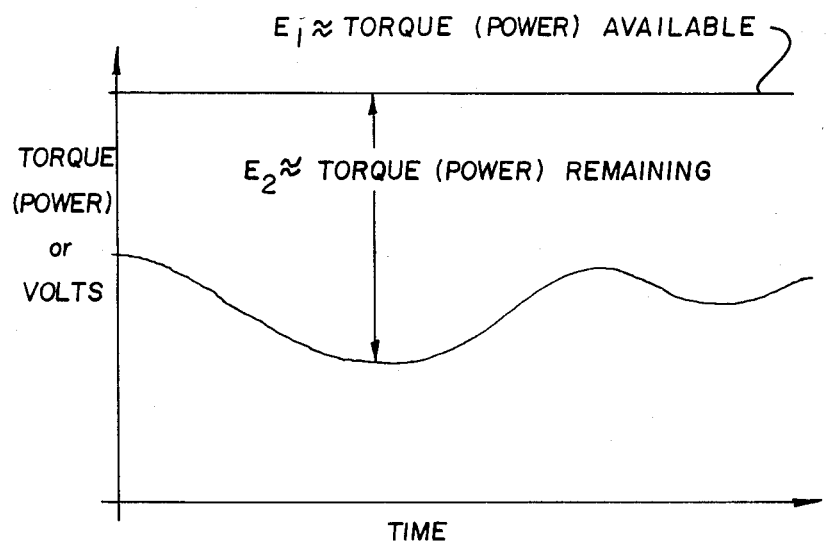
FIG. 5 is a graph showing the relationship between the total available and the amount of power available power for the thrustor or auxiliary power unit.

Referring to the drawings in particular, the invention embodied therein, in FIG. 1, comprises a power management system, in particular for managing the power of an advanced helicoptor generally designated 10 having a main rotor 12 for providing lift which is powered through a transmission 14 by a common power plant (not shown). Additional thrust is provided by an auxiliary power unit generally designated 16 which comprises a propeller 18 for example.

FIG. 2 shows the main rotor shaft 20 which is connected to transmission 14 and supplied with engine input through a shaft 22. A shaft 24 is provided for powering the auxiliary propulsion unit such as propeller 18. A strain gage bridge circuit generally shown at 28 and consisting of gages R1, R2, R3 and R4, shown schematically in FIG. 3, is installed on rotor shaft 20 in known fashion. In known fashion, strain gage bridge circuit 28 produces an output, which is proportional to the amount of torque experienced by the rotor shaft. This is also proportional to the amount of power absorbed or utilized by the main rotor. The strain gage bridge circuit thus can show positive power use by the main rotor and also negative power use when the rotor is autorotating for example.

FIG. 3 shows circuit means which can be utilized according to the invention. Signal generator 32 generates a signal, for example a voltage $E_1$ which is proportional to the total amount of power available from the power plant. This voltage is applied to two terminals of bridge circuit 28. Bridge circuit 28 generates an output or second signal, in the form of a voltage signal $E_2$ for example which is applied to signal conditioner 38. The output from the signal conditioner 38 can be utilized either to actively control a limit actuator such as the limit actuator 40 of FIG. 4 or to drive a display and produce a visual or other indication to the pilot for example in the form of the graph shown in FIG. 5, or to provide both functions. Signal generator 32 provides electrical power to strain gage circuitry 28, either through conventional slip rings (not shown) or inductively as is currently practiced. Signal conditioner 38 contains suitable state-of-the-art, electronic circuitry to provide signal amplification, filtering, and any other signal processing required to control a limit actuator and/or drive a display. Turning to FIG. 4, limit actuator 40 includes a shaft 42 which is connected to linkage 41 which is pivotally connected at 43. Movement of shaft 42 causes gap 44 to vary. The intermediate positions within this stroke are proportional to the output voltage $E_2$ generated by the circuit of FIG. 3. A pilot movable control stick 46 may be provided for example which is pivotable connected at 48 to a fixed structure of the helicoptor 10. By moving lever 46, the pilot can regulate the pitch on the blades of propeller 18 through a pitch change actuator 50. For this purpose control stick 46 is connected through a link 54 to a lever arrangement generally designated 52. As is obvious from FIG. 4, the pilot may only pivot stick 46 by an amount permitted by limit actuator 40 since the linkage 41 controlled by shaft 42 of limit actuator 40 provides a physical block to the further pivoting of stick 46. A pad 56 is connected to the lower end of control stick 46 for this purpose. Limit actuator 40 may be any type of actuator device whose stroke is proportional to voltage. This might include pulse width modulation actuators or direct digital servo actuators.

While specific embodiments of the invention have been shown and described in detail to illustrate the application of the principles of the invention, it will be understood that the invention may be embodied otherwise without departing from such principles.

What is claimed is:

1. A power management system for managing the power from at least one power plant of a flying vehicle having a main and at least one auxiliary propulsion unit powered by the power unit comprising:
   a signal generator for generating a first signal which is proportional to the power available from the power plant; and
   a circuit connected to said main propulsion unit which receives said first signal and has an output that varies according to the power used by the main propulsion unit and which generates a second signal which is proportional to the power remaining for the auxiliary propulsion unit,
   a signal conditioner adapted to receive said second signal, to provide amplification, filtering and processing of the second signal, and adapted to control a limit actuator connected to said signal conditioner and having an element extending by an amount proportional to said second signal, the flying vehicle including a control member movable to vary the amount of power supplied from the power plant to said auxiliary propulsion unit, a path of movement of said control member crossing said limit actuator element to limit the movement of said control member.

2. A power management system according to claim 1, wherein the power plant includes a transmission, the main propulsion unit comprises a rotor shaft and rotor for providing lift connected to said transmission, said circuit comprising a strain gage bridge for sensing torque on said rotor shaft, the auxiliary propulsion unit comprising a thrust propeller having variable pitch connected to said transmission, a control member linked to said thrust propeller for varying the pitch thereof.

* * * * *